UNITED STATES PATENT OFFICE.

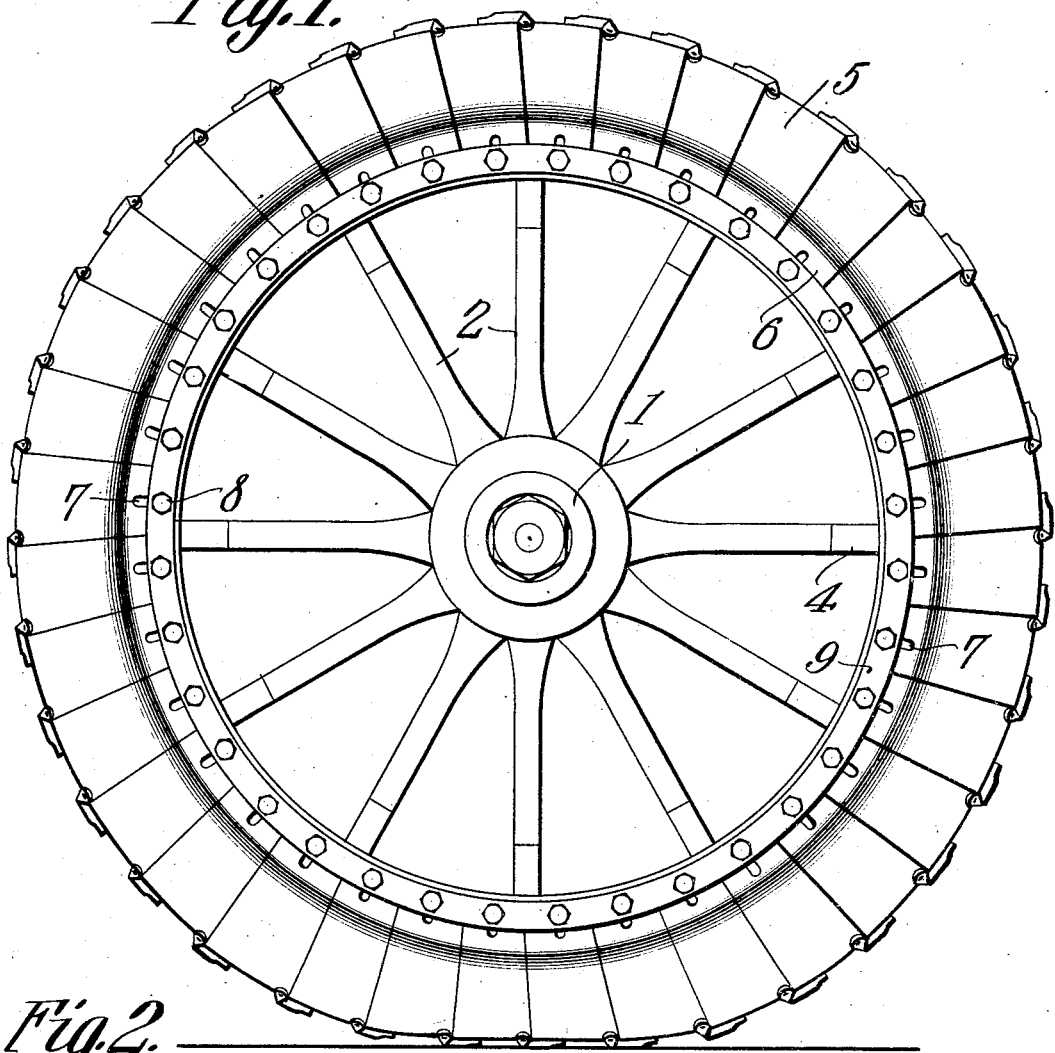
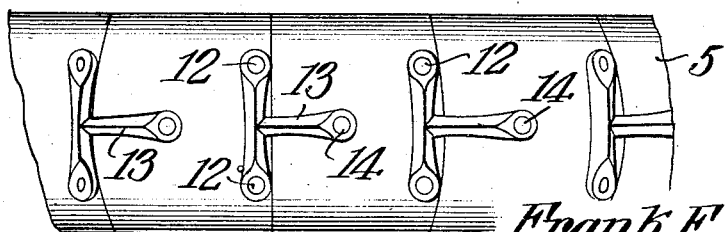

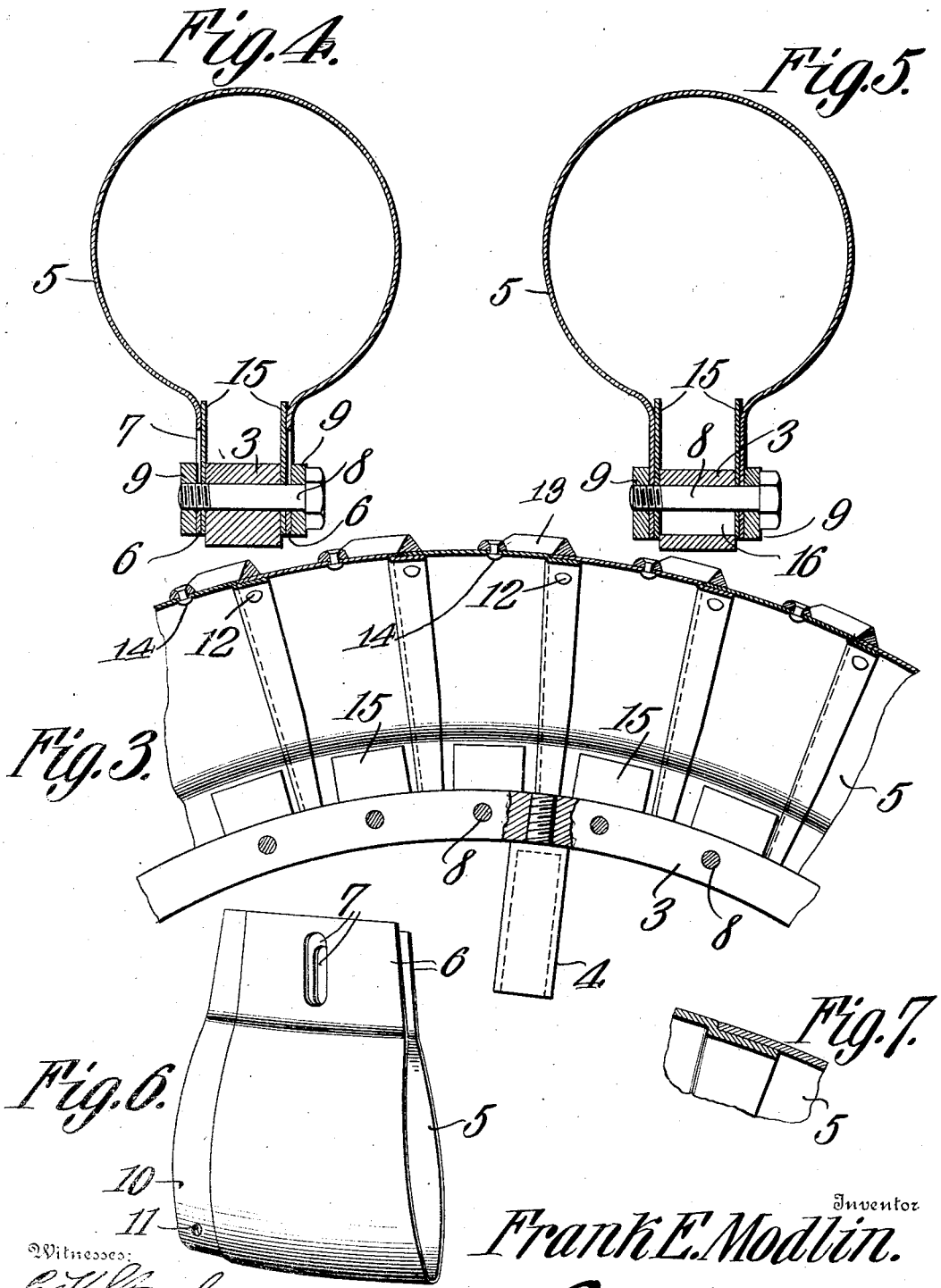

FRANK E. MODLIN, OF SOUTH SIOUX CITY, NEBRASKA, ASSIGNOR OF ONE-HALF TO FRANK H. DURGIN, OF LE MARS, IOWA.

AUTOMOBILE-TIRE.

No. 912,399.   Specification of Letters Patent.   Patented Feb. 16, 1909.

Application filed January 17, 1908. Serial No. 411,350.

*To all whom it may concern:*

Be it known that I, FRANK E. MODLIN, a citizen of the United States, residing at South Sioux City, in the county of Dakota and State of Nebraska, have invented a new and useful Automobile-Tire, of which the following is a specification.

This invention relates to automobile tires.

The object of the invention is to provide a novel form of tire of this character, which shall possess the requisite resiliency to enable it to cause the vehicle equipped with it to be smooth and easy riding; which shall be non-puncturable, which will be prevented from skidding, and in which the axle of the wheel, owing to the peculiar construction of the tire, shall be practically suspended.

With the above and other objects in view, as will appear as the nature of the invention is better understood, the same consists, generally stated, in an automobile tire composed wholly of steel.

The tire is constructed of sections each comprising an approximately tubular body portion and approximately straight extensions that are adapted to straddle the rim. The extensions are longitudinally slotted, and are held assembled for sliding movements relatively to the rim by bolts or rivets that pass through the slots, and operate further to clamp in position a pair of keepers that bear directly against the exterior surfaces of the extension.

As a matter of further and specific improvement, and in order to cause a stable union between the sections, one end of each is circumferentially reduced, and overlaps the adjacent section, the lap of the parts being of any desired extent. To hold the sections against movement relatively to each other, rivets are passed through the lapped portions and serve to hold in place ribs or spurs that are disposed at the tread of the tire and operate to prevent skidding. To preclude entrance of dirt or water to the interior of the tire, shields are interposed between the extensions and the rim and seal the slots in the extensions and are held in place by the bolts or rivets that serve to secure the keepers in position.

Owing to the manner in which the sections of the tire are assembled, in the use of the wheel, that portion that contacts with the ground will flatten somewhat, and this pressure is transmitted throughout the entire extent of the tire, causing it on its transverse axis to assume an elliptical shape, while that portion of the tire opposite or directly over the ground contact point will be flattened, so that, in effect, the hub of the wheel will be suspended and will yield as the wheel revolves, thereby securing easy running, and also minimizing the strain on the tire.

The tire sections will be made of finely tempered spring steel, and will thus be capable of yielding without danger of breaking.

The spokes of the wheel are held assembled with the rim by providing the latter with sockets having a threaded engagement with the rim and in which the ends of the spokes are seated. Of course, if preferred, the spokes may be directly connected with the rim, as with ordinary automobile wheels; but the construction first given will be preferred, as it will secure a more rigid and wear resisting wheel.

Further, and more specific details of construction will be hereinafter fully described, and particularly defined in the appended claims.

In the accompanying drawings, forming a part of this specification, and in which like characters of reference indicate corresponding parts, Figure 1 is a view in side elevation of an automobile tire constructed in accordance with the present invention. Fig. 2 is a top plan view of a section of the tire, showing more particularly the means for preventing skidding. Fig. 3 is a vertical longitudinal sectional view through the tire. Fig. 4 is a transverse sectional view through the form of tire shown in Fig. 1. Fig. 5 is a transverse sectional view through a slightly modified form of tire. Fig. 6 is a perspective detail view of one of the tire sections. Fig. 7 is a fragmentary detail view in section of a portion of the tire.

Referring to the drawings, 1 designates a hub of an automobile wheel, and 2 the spokes, and, as these parts may be of the usual or any preferred construction, further description thereof is deemed unnecessary.

The present invention resides in the novel form of tire proper, in the rim, and in the manner in which the parts are constructed and assembled.

The rim 3, shown in section in Fig. 4, is made of iron or steel, and is preferably, though not necessarily, approximately rectangular in cross section. The rim has rigidly secured with it, in this instance by a threaded connection, as shown in Fig. 3, spoke sockets 4 in which the outer ends of the spokes are seated, and held in any preferred manner.

The tire is composed of a series of segments or sections each of which consists of an approximately tubular body portion 5 and a pair of straight extensions 6 that are adapted to straddle the rim, as clearly shown in Figs. 4 and 5 and lie parallel therewith. In the form of tire section shown in Figs. 4 and 6, particularly, the extensions 6 are provided with longitudinal slots 7, that are adapted to receive bolts or rivets 8 that serve, in conjunction with annular keepers 9, to hold the sections assembled with the rim. These keepers are flat annuli and bear directly against the extensions 6, as clearly shown in Figs. 4 and 5. As shown in Fig. 4, the bolt passes through both of the keepers and is threaded into one of them; but it will be obvious that rivets may be substituted for the bolts if found necessary or advantageous. The objects of the slots is to permit the sections to have a sliding connection with the rim, so that in use the tire will flatten at its point of contact with the ground, as shown in Fig. 1, and while this flattening results partly from the compression of the sections, it also results from the extensions sliding inward toward the hub.

Each of the sections is circumferentially reduced at one end, as shown at 10, thus to permit the sections to overlap with each other, and the overlapped portions of the sections are provided with orifices 11 through which are passed rivets 12 that operate to hold the overlapped portions firmly assembled. These rivets also serve to secure to the tread portion of the tire ribs or spurs 13, which, as shown in Fig. 2, are approximately T-shaped in contour, and, as shown in Fig. 3, are triangular in cross section. In addition to the rivets 12, each of the ribs is secured to the tread of the tire by a third rivet 14.

In order to preclude entrance of dust or mud to the interior of the tire, shields 15 are employed, which are interposed between the extensions and the rim and seal the slots 7, the shields being orificed to receive the fastening members 8.

Instead of providing the tire sections with slots, to permit sliding movement relatively to the rim, the rim may be provided with slots 16 through which the bolts or rivets 8 project, as shown in Fig. 5, and thereby secure the same result.

As will be noticed by reference to Fig. 6, one edge of the section is disposed at right angles to the crest or bend of the section, and the other edge is disposed at an angle thereto, the object of this arrangement being to secure a close and accurate fit between the sections, and also to insure the requisite sliding movements between the sections and the rim.

Owing to the yielding character of this tire, it will be found in use equally as effective as the ordinary pneumatic tires in common use and will possess advantages thereover, inasmuch as it is cheaper, is puncture proof, and in the event of the destruction of one or more of the sections, these may be replaced at slight expense and thereby restore the tire to its normal condition.

I claim:—

1. An automobile tire comprising a rim, a tire composed of metallic sections overlapped at their edge portions, and slidably connected with the rim, non-skidding members disposed on the tread of the tire, and fastening means passing through the non-skidding members and through the tread of the tire and overlapped portions of the sections to hold the parts assembled.

2. An automobile tire comprising a rim, a tire composed of metallic sections overlapped at their edge portions, and slidably connected with the rim, T-shaped non-skidding members disposed on the tread of the tire with their cross arms arranged over the overlapped portions of the sections, and fastening means passing through the non-skidding members and through the overlapped portions and the tread of the sections to hold the parts assembled.

3. An automobile tire comprising a rim, a tire composed of tubular sections overlapped at their edge portions, and having parallel disposed extensions arranged exteriorly of the rim, non-skidding members disposed at the tread of the sections and at the overlapped portions thereof, fastening means for holding the sections and non-skidding members assembled, shields interposed between the tire sections and the rim, and means for connecting the tire and shields with the rim.

In testimony that I claim the foregoing as my own, I have hereto affixed my signature in the presence of two witnesses.

FRANK E. MODLIN.

Witnesses:
C. E. DOYLE,
M. O. ZINK.